(12) United States Patent
Brown et al.

(10) Patent No.: US 10,540,317 B2
(45) Date of Patent: *Jan. 21, 2020

(54) EFFICIENT MEANS OF COMBINING NETWORK TRAFFIC FOR 64BIT AND 31 BIT WORKLOADS

(71) Applicant: International Business Machines Corporation, Armonk, NY (US)

(72) Inventors: Patrick G. Brown, Hillsboro, NC (US); Michael J. Fox, New Hill, NC (US); Jeffrey D. Haggar, Holly Springs, NC (US); Jerry W. Stevens, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 433 days.

This patent is subject to a terminal disclaimer.

(21) Appl. No.: 14/793,928

(22) Filed: Jul. 8, 2015

(65) Prior Publication Data

US 2017/0012889 A1 Jan. 12, 2017

(51) Int. Cl.
*G06F 15/167* (2006.01)
*H04L 29/08* (2006.01)
(Continued)

(52) U.S. Cl.
CPC .......... *G06F 15/167* (2013.01); *H04L 47/522* (2013.01); *H04L 47/822* (2013.01); *H04L 67/1097* (2013.01)

(58) Field of Classification Search
CPC ..... G06F 15/167; H04L 67/32; H04L 47/522; H04L 47/822; H04L 67/1097; H04L 67/2842
See application file for complete search history.

(56) References Cited

U.S. PATENT DOCUMENTS 7,930,422 B2    4/2011   Freimuth et al.
7,933,283 B1 *   4/2011   Liu .................. H04L 47/10
                                                        370/412

(Continued)

OTHER PUBLICATIONS

List of IBM Patents or Applications Treated as Related.

*Primary Examiner* — Hamza N Algibhah
*Assistant Examiner* — James Ross Hollister
(74) *Attorney, Agent, or Firm* — Terrile, Cannatti & Chambers, LLP; Stephen A. Terrile

(57) ABSTRACT

A method, system and computer-usable medium are disclosed for performing a network traffic combination operation. With the network traffic combination operation, a plurality of input queues are defined by an operating system for an adapter based upon workload type (e.g., as determined by a transport layer). Additionally, the operating system defines each input queue to match a virtual memory architecture of the transport layer (e.g., one input queue is defined as 31 bit and other input queue is defined as 64 bit). When data is received off the wire as inbound data from a physical NIC, the network adapter associates the inbound data with the appropriate memory type. Thus, data copies are eliminated and memory consumption and associated storage management operations are reduced for the smaller bit architecture communications while allowing the operating system to continue executing in a larger bit architecture configuration.

12 Claims, 5 Drawing Sheets

(51) Int. Cl.
*H04L 12/873* (2013.01)
*H04L 12/911* (2013.01)

(56) References Cited

U.S. PATENT DOCUMENTS

| | | |
|---|---|---|
| 8,402,190 B2 | 3/2013 | Isrel, Jr. et al. |
| 8,527,664 B2 | 9/2013 | Lin et al. |
| 8,719,479 B2 | 5/2014 | Isrel, Jr. et al. |
| 2004/0202185 A1* | 10/2004 | Ratcliff ............... H04L 12/4641 370/395.53 |
| 2005/0204058 A1* | 9/2005 | Philbrick ................ H04L 29/06 709/238 |
| 2005/0223118 A1 | 10/2005 | Tucker et al. |
| 2008/0028103 A1 | 1/2008 | Schlansker et al. |
| 2008/0267203 A1* | 10/2008 | Curcio ................... H04L 49/90 370/412 |
| 2010/0205382 A1* | 8/2010 | Giacobbe ................ H04L 47/29 711/147 |
| 2012/0072677 A1 | 3/2012 | Biswas et al. |
| 2013/0151743 A1* | 6/2013 | Isrel, Jr. ................. G06F 13/24 710/261 |
| 2014/0019571 A1* | 1/2014 | Cardona ................ H04L 47/56 709/212 |
| 2014/0164553 A1* | 6/2014 | Gill ........................ H04L 47/50 709/216 |
| 2016/0140045 A1* | 5/2016 | Bergeron ................ H04L 69/22 711/105 |

* cited by examiner

EFFICIENT MEANS OF COMBINING NETWORK TRAFFIC FOR 64BIT AND 31 BIT WORKLOADS

BACKGROUND OF THE INVENTION

Field of the Invention

The present invention relates in general to the field of computers and similar technologies, and in particular to software utilized in this field. Still more particularly, it relates to a method, system and computer-usable medium for combining network traffic for variable bit width workloads.

Description of the Related Art it is known to provide large scale computing platforms, such as an IBM System z mainframe computing platform with an operating system, such as the z/OS operating system provided by IBM Corporation. For example, the z/OS operating system includes a subsystem called the Communications Server (CS), which includes a storage manager subsystem called the Common Storage Manager (CSM) fir use by Systems Network Architecture (SNA) and/or TCP/IP protocol stacks to perform input/output (I/O) operations.

It is known to configure an IBM System z mainframe type computer platform with a network adapter such as an IBM Open Systems Adapter (OSA) type adapter. The IBM Open Systems Adapter (OSA) type adapter is a hardware element that interfaces between an IBM S/390 or zSeries processor and a network, which may be a private network within an enterprise, a public network, or a combination of both. The OSA type adapter enables the computer platform to virtualize and abstract details of an actual hardware Network Interface Card (NIC). The host communicates with the OSA type adapter and the OSA type adapter communicates with the NIC. The OSA type adapter provides many advantages, primarily in the area of sharing and virtualization.

FIG. 1, labeled Prior Art, shows an example of a mainframe type computing platforms where the operating system is enabled at a certain bit width communications (e.g., at 64-bit wide) for one transport layer (e.g. a TCP/IP transport layer) but not enabled for the bit width communications for another transport layer (e.g. a SNA/EE transport layer). In this example, inbound data is received from an OSA type adapter (e.g., a 10GbE OSA adapter) and feeds both stacks and upper layer application program interfaces (APIs). As data is received from a network for the SNA/EE transport layer (which is not enabled for 64 bit communications) the 64 bit OS (e.g. via a device driver) must copy all data back to 31 bit virtual memory before the data can be presented to a SNA stack. In scenarios where the adapter is running near line speed and a larger portion of the inbound traffic (e.g. 70%) is associated with the SNA stack (and its applications) then the in-line processing cycles to copy the data and manage the additional memory can be extensive (degrading the SNA performance when upgrading the OS to 64 bit virtual memory support).

SUMMARY OF THE INVENTION

A method, system and computer-usable medium are disclosed for performing a network traffic combination operation. With the network traffic combination operation, a plurality of input queues are defined by an operating system for an adapter based upon workload type (e.g., as determined by a transport layer) where the operating system defines each input queue to match a virtual memory architecture of the transport layer (e.g., one input queue is defined as a 31 bit input queue and other input queue is defined as a 64 bit input queue). When data is received off the wire as inbound data from a physical NIC, the network adapter associates the inbound data with the appropriate input queue and thereby the corresponding memory type. Thus, data copies are eliminated and memory consumption and storage management operations are reduced for the smaller bit architecture communications while allowing the operating system to continue executing in a larger bit architecture configuration. E.g., the operating system executes in a 64 bit configuration with appropriate 64 bit enabled paths while legacy workloads remain unchanged and are not exposed to a 64 bit virtual memory.

More specifically, in one embodiment, the invention relates to a computer-implemented method for separating network traffic into processing queues based on memory size addressability comprising: providing a memory type attribute, the memory type attribute comprising a first memory type attribute indication for a first memory size and a second memory type attribute indication for a second memory size, the first memory size being different from the second memory size; providing a first input queue, the first input queue being configured according the first memory type attribute indication; providing a second input queue, the second input queue being configured according the second memory type attribute indication; and, separating network traffic into the first input queue and the second input queue based on memory size addressability.

In another embodiment, the invention relates to a system comprising a processor; a data bus coupled to the processor; and a computer-usable medium embodying computer program code, the computer-usable medium being coupled to the data bus. The computer program code used for separating network traffic into processing queues based on memory size addressability and comprising instructions executable by the processor and configured for: providing a memory type attribute, the memory type attribute comprising a first memory type attribute indication for a first memory size and a second memory type attribute indication for a second memory size, the first memory size being different from the second memory size; providing a first input queue, the first input queue being configured according the first memory type attribute indication; providing a second input queue, the second input queue being configured according the second memory type attribute indication; and, separating network traffic into the first input queue and the second input queue based on memory size addressability.

In another embodiment, the invention relates to a non-transitory, computer-readable storage medium embodying computer program code, the computer program code comprising computer executable instructions configured for: providing a memory type attribute, the memory type attribute comprising a first memory type attribute indication for a first memory size and a second memory type attribute indication for a second memory size, the first memory size being different from the second memory size; providing a first input queue, the first input queue being configured according the first memory type attribute indication; providing a second input queue, the second input queue being configured according the second memory type attribute indication; and, separating network traffic into the first input queue and the second input queue based on memory size addressability.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
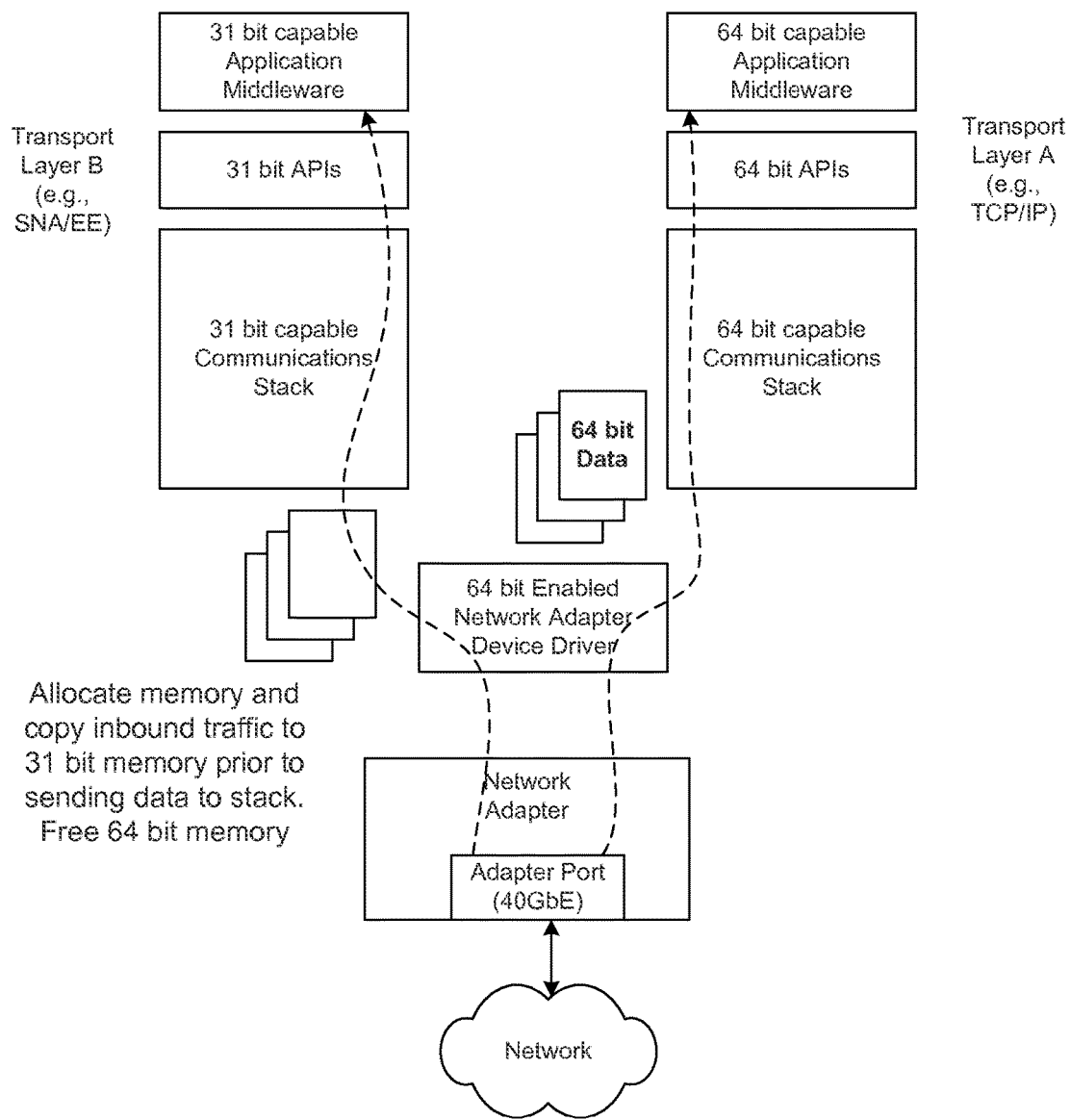
FIG. 1, labeled Prior Art, shows an example of a mainframe type computing platform.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
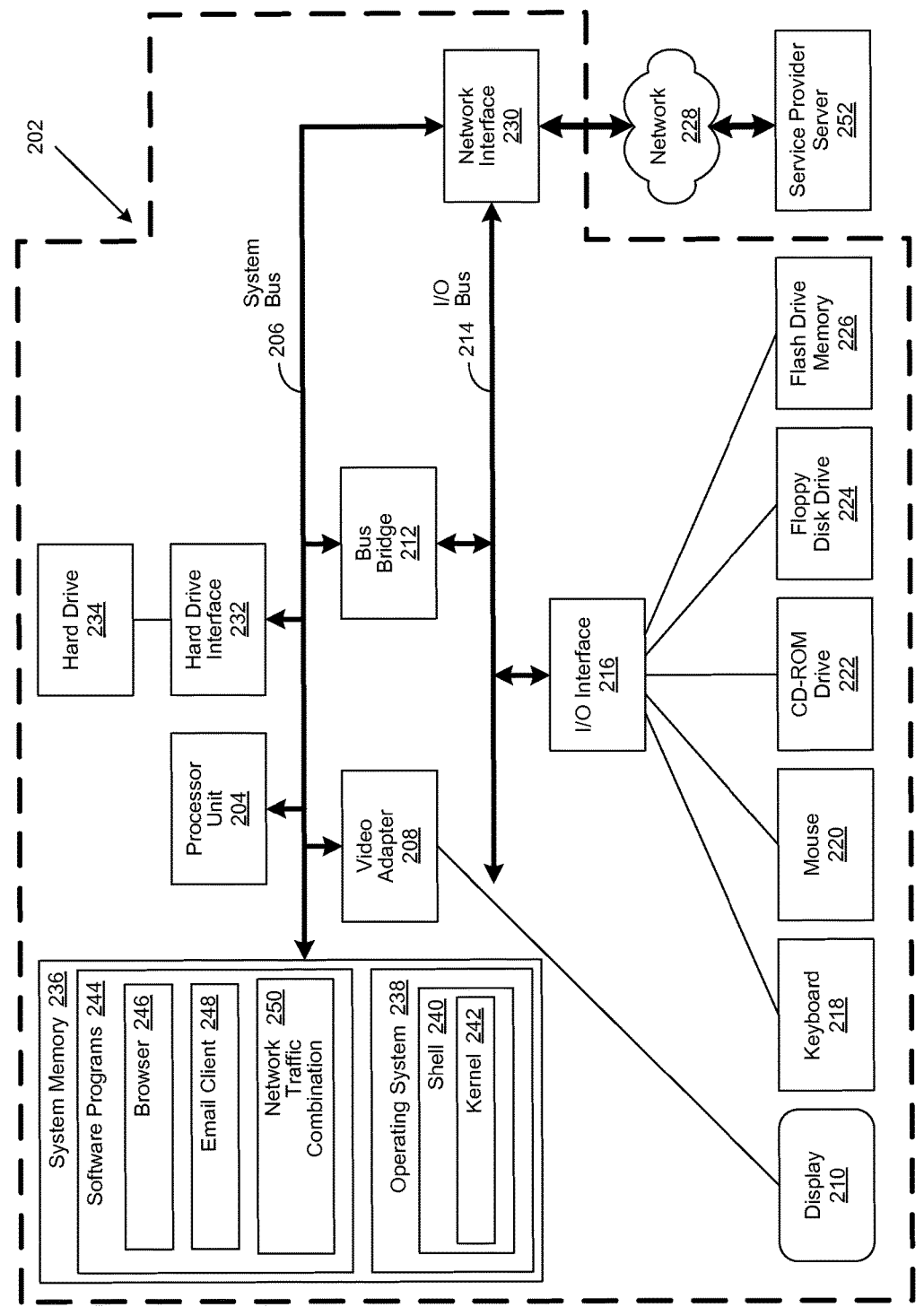
FIG. 2 shows an exemplary client computer in which the present invention may be implemented.

FIG. 2 is a block diagram of an exemplary computer system 202 in which the present invention may be utilized. Computer system 202 includes a processor unit 204 that is coupled to a system bus 206, A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

Computer system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, computer system 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the computer system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248, Browser 246 includes program modules and instructions enabling a World Wide Web (WWW) client (i.e., computer system 202) to send and receive network messages to the Internet using HyperText Transfer Protocol (MIT) messaging, thus enabling communication with service provider server 252. In various embodiments, software programs 244 may also include a network traffic combination module 250. In these and other embodiments, the network traffic combination module 250 includes code for implementing the processes described hereinbelow. In one embodiment, computer system 202 is able to download the network traffic combination module 250 from a service provider server 252.

The hardware elements depicted in computer system 202 are not intended to be exhaustive, but rather are representative to highlight components used by the present invention. For instance, computer system 202 may include alternate memory storage devices such as magnetic cassettes, Digital Versatile Disks (DVDs), Bernoulli cartridges, and the like. These and other variations are intended to be within the spirit, scope and intent of the present invention.

The network traffic combination module 250 performs a network traffic combination operation. With the network traffic combination operation, a plurality of input queues are defined by an operating system for an adapter based upon workload type (e.g., as determined by a transport layer). Additionally, the operating system defines some input queues to match a virtual memory architecture of the transport layer (e.g., some input queues are defined as 31 bit input queues and other input queues are defined as 64 bit input queues). When data is received off the wire as inbound data from a physical NIC, the network adapter associates the inbound data with the appropriate memory type. Thus, data copies and thus the associated memory consumption are eliminated for the smaller bit architecture communications while allowing the operating system to continue executing in a larger bit architecture configuration. E.g., the operating system executes in a 64 bit configuration with appropriate 64 bit enable paths while legacy workloads remain unchanged and are not exposed to a 64 bit virtual memory. Additionally, storage management associated with obtaining and managing two buffers for every packet when a 31 bit operation starts in a 64 bit architecture is significantly reduced. This reduction includes avoiding storage management operations relating to obtaining a 31 bit buffer, copying the packet to the 31 bit buffer, emitting the packet to the stack, returning to the 64 bit buffer, etc.

Figure 3:
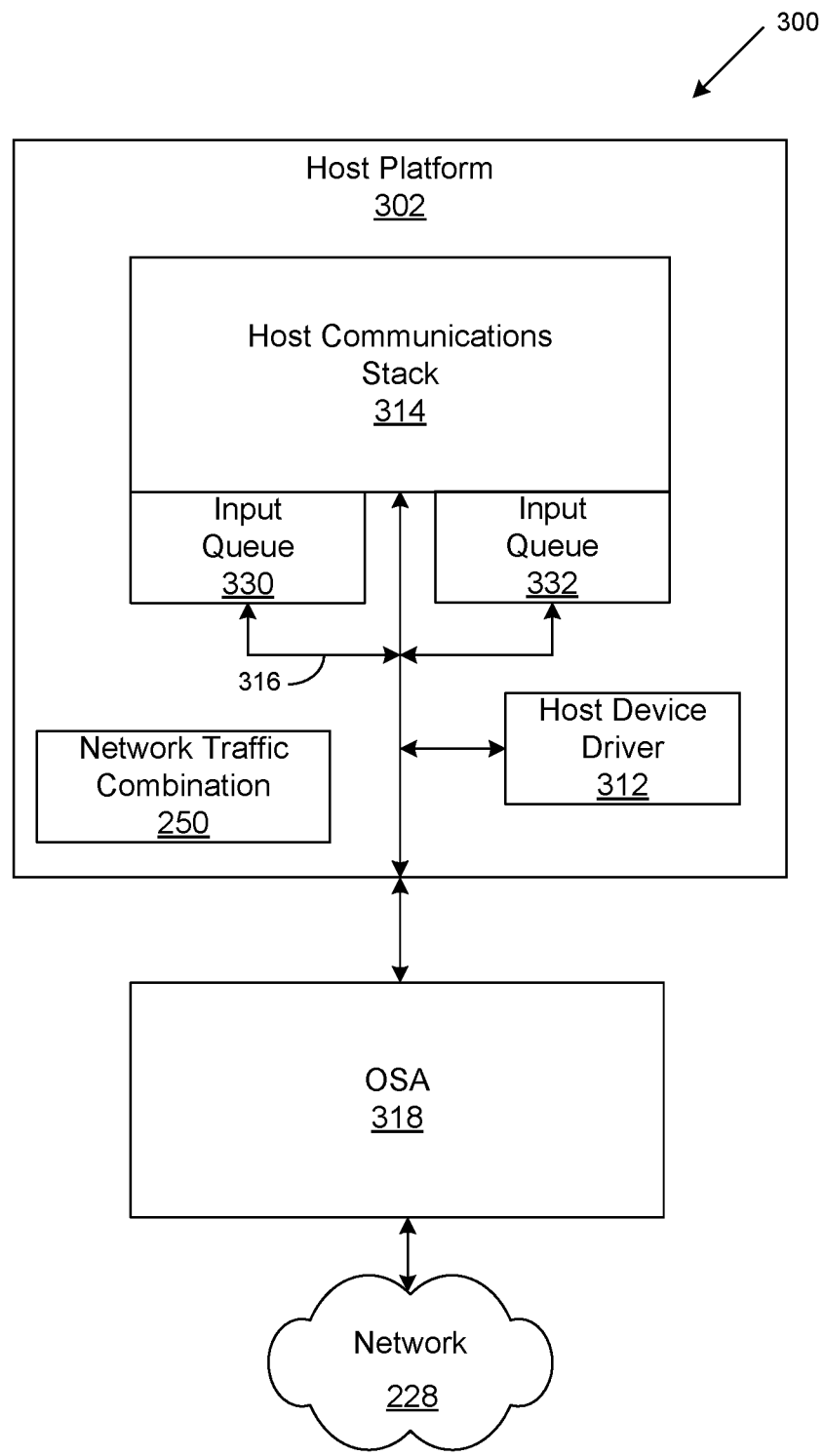
FIG. 3 shows a block diagram of a system for performing a network traffic combination operation.

Referring to FIG. 3, a block diagram of an environment 300 for performing a network traffic combination operation is shown. The environment 300 includes a host platform 302, a host device driver 312, a host communications stack 314 and a data bus 316. The host platform 302 also includes a first input queue 330 and a second input queue 332. The first input queue 330 includes an associated input queue storage manager 334 and the second input queue includes an associated second input queue storage manager 336. The first input queue storage manager 334 and the second input queue storage manager 336 manage associated input queue operations based upon an attribute of the associated input queue. The data bus 316 connects to the host real memory system which in turn provides input data to the host communications stack 314, the first input queue 330, the second input queue 332 and the host device driver 312. The environment also includes an OSA 318 operationally coupled to the host platform 302, and a network 228 in communication with the OSA 318. Those of skill in the art recognize that the environment 300 may be simpler or more complex than illustrated.

The host platform 302 may be a System z series mainframe computer capable of running the z/OS operating system (System z and z/OS are trademarks of International Business Machines Corporation) or other similar mainframe computer. The host platform 302 may include some or all of the components of the computer system 202. The host communications stack 314 may be a Transmission Control Protocol/Internet Protocol (TCP/IP) stack as is commonly known in the art.

The host device driver 312 may include a software application that processes incoming data from the input queues 330, 332 and schedules a host communications stack 314 to retrieve incoming data from the input queues 330, 332. In certain embodiments, the processing the incoming data is via direct memory access (DMA) type operations. Furthermore, the host device driver 312 may control provision of outgoing data from the host communications stack 314. Furthermore, the host device driver 312 may signal the OSA 318 when outgoing data is ready for transmitting.

In certain embodiments, the OSA 318 is a mainframe network adapter that may be installed in a mainframe I/O cage or otherwise connected to a mainframe and may include a conventional processor as is known in the art. The OSA 318 may comprise an OSA-Express model or other similar model.

When receiving incoming data, the OSA 318 presents the host device driver 312 with newly arrived data, and then generates an I/O interrupt to the host platform 302 so the host device driver 312 can process the newly arrived data.

Each input queue 330, 332 includes a plurality of characteristics and performs a plurality of functions which are controlled via the network traffic combination module 250. More specifically, the network traffic combination module 250 defines a virtual memory type attribute for each input queue 330, 332. In certain embodiments this virtual memory type attribute includes a 31 bit virtual memory type indication and a 64 bit virtual memory type indication. Additionally, each input queue 330, 332 is initialized and populated with a respective virtual memory based upon the virtual memory type attribute associated with the particular input queue 330, 332. Additionally, the network traffic combination module 250 registers each input queue 330, 332 with the adapter (such as the OSA 318) as an individual input queue (e.g., based on an Internet Protocol (IP) address or a list of ordered elements (e.g., a 2/4 tuple), etc). Each input queue 330, 332 also includes a respective input queue memory cache which is used for inline memory replenishment for data moving through the input queue. Additionally, the network traffic combination module 250 controls replenishment, expansion and contraction of the input queue memory cache via the associated input queue storage manager (e.g., a 31 bit input queue storage manager manages a 31 bit input queue and a 64 bit input queue storage manager managers a 64 bit input queue). In various embodiments, the storage manager is responsible for keeping the associated input queue populated, meeting any demands of the network relating to the associated input queue, and/or adjusting to the dynamics of fluctuating input data rates that can reach the line speed of the network (e.g., 10GbE). Additionally, the network traffic combination module 250 controls the inline memory management for each input queue. This inline memory management includes defining functional error paths, exception code paths, performing tracking operations as well as other known memory management functions.

Figure 4:
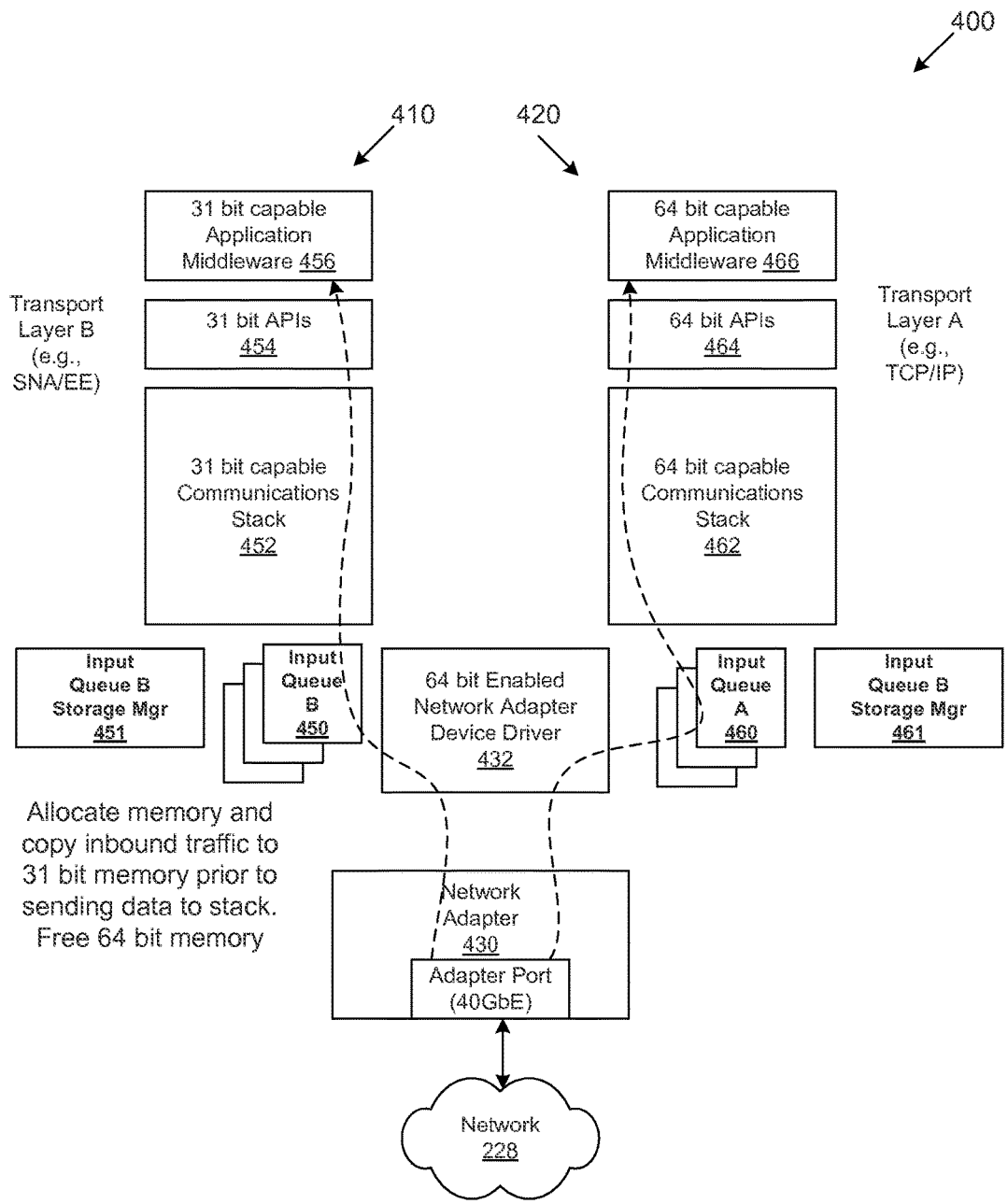
FIG. 4 shows a block diagram of a mainframe type computing platform.

Referring to FIG. 4, an operational block diagram of a network traffic combination environment 400 for use within a mainframe type computing platform is shown. More specifically, the network traffic combination environment 400 includes a first transport layer 410 and a second transport layer 420. The network traffic combination environment 400 also includes a network adapter 430 which in certain embodiments may be an OSA), which may include a high bandwidth (e.g., 40GbE) adapter port, as well as a network adapter driver 432. The network adapter 430 is coupled to a network 332 which in certain embodiments corresponds to network 228.

The first transport layer 410 includes a first input queue 450, a first input queue storage manager 451, a first communications stack 452, a first application program interface 454 and a first middleware component 456. The second transport layer 412 includes a second input queue 460, a second input queue storage manager 461, a second communications stack 462, a second application program interface 464 and a second middleware component 466.

Performing a network traffic combination operation within the network traffic combination environment 400 enables elimination of the additional overhead of necessary for copying data and managing additional memory in many known network environments. The network traffic combination environment 400 includes a plurality of input queues as well as a virtual memory type attribute. Each input queue is populated with an appropriate memory type supported by the target transport layer (i.e., the target protocol stack))). The adapter 430 directs inbound network traffic directly to the appropriate input queue via a network traffic combination operation and then into the appropriate memory type. With such an environment, both transport layers execute their respective modes (based on a respective input queue virtual memory type) without requiring additional overhead.

Figure 5:
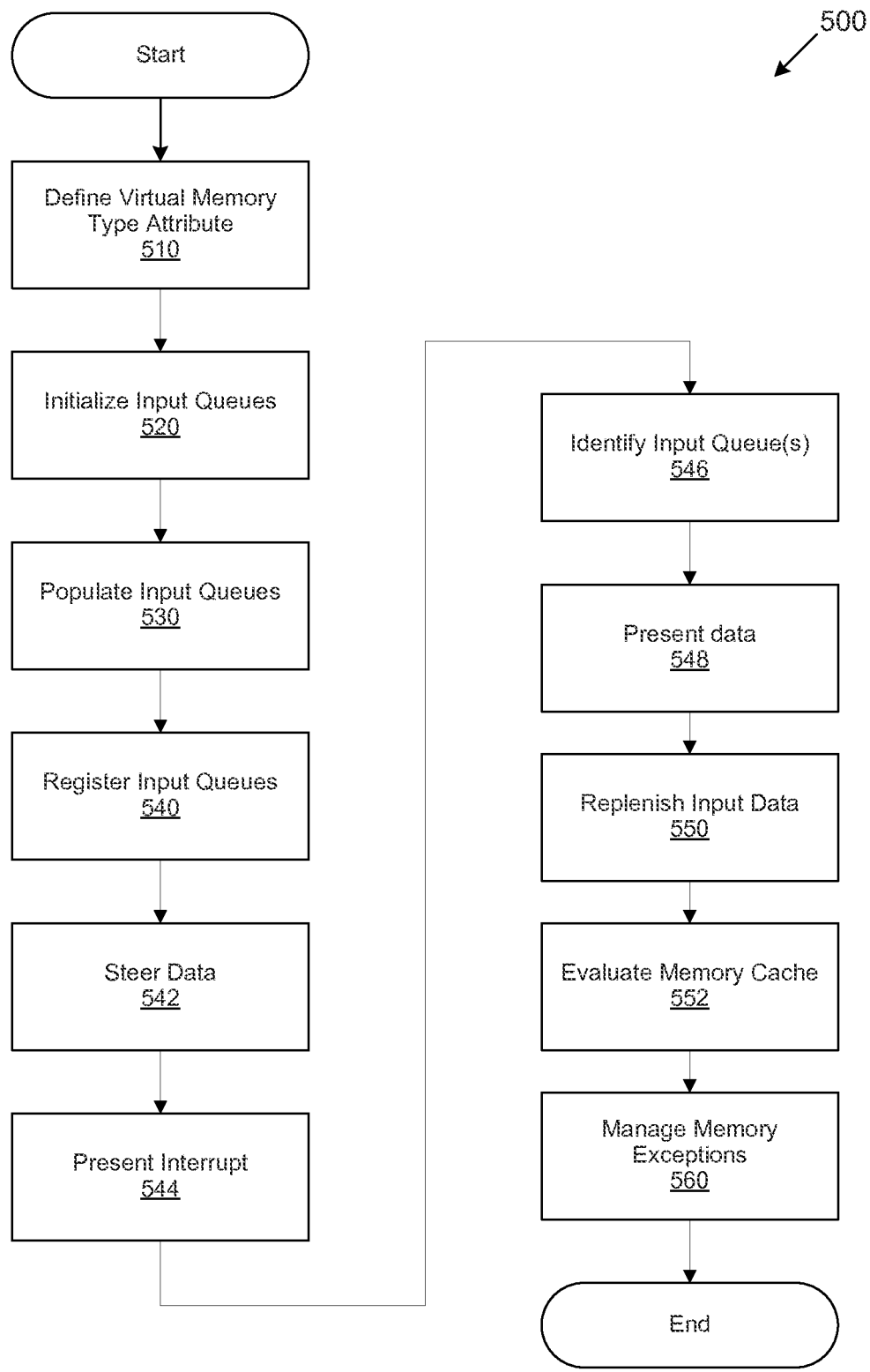
FIG. 5 shows a flow chart of the operation of network traffic combination system.

FIG. 5 shows a flow chart of the operation of network traffic combination system 500. In various embodiments, the network traffic combination module 250 performs some or all of the functions of the network traffic combination system 500.

More specifically, a network traffic combination operation begins at step 510 with the network traffic combination system 500 defining a virtual memory type attribute for a plurality of input queues. In certain embodiments this virtual memory type attribute includes a 31 bit virtual memory type indication and a 64 bit virtual memory type indication. Next, at step 520 each input queue is initialized based upon the virtual memory type attribute. Next at step 530, each input queue is populated with a respective virtual memory based upon the virtual memory type attribute associated with the particular input queue. Next, at step 540, the network traffic combination system 500 registers each input queue with a network adapter (such as the OSA) as an individual input queue (e.g., based on an Internet Protocol (IP) address or a list of ordered elements (e.g., a 2/4 tuple), etc.).

Next, at step 542, the data is steered by the network adapter to a given input queue (e.g., based upon the N tuple of the data) as the data arrives from the network. Next, at step 544, the network adapter presents an interrupt to the driver. Next, at step 546 the driver identifies an input queue(s) with ready work. Next at step 548, the newly arrived data is presented to the appropriate host transport stack. Next, at step 550, data moving through an input queue is replenished via a respective input queue memory cache. In certain embodiments, the network traffic combination system 500 controls replenishment, expansion and contraction of the input queue memory cache. Next, at step 552 the data rate to the memory supply is tracked to evaluate whether the driver is keeping up with an appropriate amount of memory. If the driver is not keeping up (e.g., the data rate has spiked), then the system dynamically increases (i.e., expands) the input queue memory cache (based on memory type). If the data rate to the memory supply is straying too far ahead (e.g., the spike has dissipated), then the system might slowly contract the cache. This tracking typically occurs inline within the normal inbound data path (such as using simple metrics (e.g., heuristics) and then evaluating trends. When necessary or desirable, the system adjusts the cache by scheduling a background process. In certain embodiments, this background process may be an aggressive reaction when the data rate is behind or a lazy reaction when the data rate is ahead. Next, at step 560, the network traffic combination system 500 manages memory exceptions for each input queue. In certain embodiments, the managing of the memory exceptions can include inline memory management which includes defining functional error paths, exception code paths, performing tracking operations as well as other known memory management functions.

In certain embodiments, all steps relating to memory management of an input queue are performed by the appropriate input queue storage manager. Using the input queue storage manager allows processing based on the respective unique memory type based upon the input queue memory type attribute. For example, in certain embodiments, steps 530, 550, 552 and 560 are performed by the appropriate input queue storage manager.

Although the present invention has been described in detail, it should be understood that various changes, substitutions and alterations can be made hereto without departing from the spirit and scope of the invention as defined by the appended claims.

What is claimed is:
1. A system comprising:
a processor;
a data bus coupled to the processor; and
a computer-usable medium embodying computer program code, the computer-usable medium being coupled to the data bus, the computer program code used for separating network traffic within a network traffic combination environment into processing queues based on memory size addressability and comprising instructions executable by the processor and configured for:
providing a memory type attribute, the memory type attribute comprising a first memory type attribute indication for a first memory size, the first memory type attribute indication indicating a communications width of the first memory size, and a second memory type attribute indication for a second memory size, the second memory type attribute indication indicating a communications width of the second memory size, the first memory size being different from the second memory size;
providing a first input queue, the first input queue being configured according the first memory type attribute indication;
providing a second input queue, the second input queue being configured according the second memory type attribute indication;
separating network traffic into the first input queue and the second input queue based on memory size addressability, the separating network traffic being performed by an Open Systems Adapter (OSA) type network adapter, the OSA type network adapter using the first memory type attribute indication and the second memory type attribute indication when performing the separating, the OSA type network adapter presenting a host device driver with newly arrived data and generating an I/O interrupt to a host platform to allow the host device driver to process the newly arrived data; and providing the data to a respective communications stack based on an application addressable memory type, the application addressable memory type comprising a first addressable memory type and a second addressable memory type, the first addressable memory type comprising at least one of 31 bit addressable memory type and a 32 bit addressable memory type and the second addressable memory type comprises a 64 bit addressable memory type; and wherein
the network traffic combination environment comprises a first transport layer and a second transport layer, the first transport layer comprising a first application program interface, a first middleware component and the first input queue, the second transport layer comprising a second application program interface, a second middleware component and the second input queue, the first transport layer and the second transport layer executing respective modes without requiring additional overhead.

2. The system of claim 1, wherein:
the first transport layer further comprises a first input queue storage manager;
the second transport layer further comprises a second input queue storage manager;
the first input queue comprises a first input queue buffer;
the second input queue comprises a second input queue buffer; and,
buffers for data for the first input queue and the second input queue are supported by the first input queue storage manager and the second input queue storage manager, respectively.

3. The system of claim 2, wherein:
the first transport layer further comprises a first communications stack;
the second transport layer further comprises a second communications stack; and wherein the instructions executable by the processor are further configured for:
using the first input queue storage manager and the second input queue storage manager to provide the data to the respective communications stack based on the application addressable memory type; and
transferring network data between the network and the application via the respective communications stack.

4. The system of claim 1, wherein the instructions executable by the processor are further configured for:
controlling replenishment, expansion and contraction of the first input queue and the second input queue based on the network traffic.

5. The system of claim 1, wherein the instructions executable by the processor are further configured for:
utilizing the first input queue for direct memory access (DMA) for a first memory type and the second input queue for direct memory access (DMA) for a second memory type.

6. A non-transitory, computer-readable storage medium embodying computer program code for separating network traffic within a network traffic combination environment, the computer program code comprising computer executable instructions configured for:
providing a memory type attribute, the memory type attribute comprising a first memory type attribute indication for a first memory size, the first memory type attribute indication indicating a communications width of the first memory size, and a second memory type attribute indication for a second memory size, the second memory type attribute indication indicating a communications width of the second memory size, the first memory size being different from the second memory size;

providing a first input queue, the first input queue being configured according the first memory type attribute indication;

providing a second input queue, the second input queue being configured according the second memory type attribute indication;

separating network traffic into the first input queue and the second input queue based on memory size addressability, the separating network traffic being performed by an Open Systems Adapter (OSA) type network adapter, the OSA type network adapter using the first memory type attribute indication and the second memory type attribute indication when performing the separating, the OSA type network adapter presenting a host device driver with newly arrived data and generating an I/O interrupt to a host platform to allow the host device driver to process the newly arrived data; and providing the data to a respective communications stack based on an application addressable memory type, the application addressable memory type comprising a first addressable memory type and a second addressable memory type, the first addressable memory type comprising at least one of 31 bit addressable memory type and a 32 bit addressable memory type and the second addressable memory type comprises a 64 bit addressable memory type; and wherein the network traffic combination environment comprises a first transport layer and a second transport layer, the first transport layer comprising a first application program interface, a first middleware component and the first input queue, the second transport layer comprising a second application program interface, a second middleware component and the second input queue, the first transport layer and the second transport layer executing respective modes without requiring additional overhead.

7. The non-transitory, computer-readable storage medium of claim 6, wherein:

the first transport layer further comprises a first input queue storage manager;

the second transport layer further comprises a second input queue storage manager;

the first input queue comprises a first input queue buffer;

the second input queue comprises a second input queue buffer; and, buffers for data for the first input queue and the second input queue are supported by the first input queue storage manager and the second input queue storage manager, respectively.

8. The non-transitory, computer-readable storage medium of claim 7, wherein:

the first transport layer further comprises a first communications stack;

the second transport layer further comprises a second communications stack; and wherein the computer executable instructions are further configured for:

using the first input queue storage manager and the second input queue storage manager to provide the data to the respective communications stack based on the application addressable memory type; and transferring network data between the network and the application via the respective communications stack.

9. The non-transitory, computer-readable storage medium of claim 6, wherein the computer executable instructions are further configured for:

controlling replenishment, expansion and contraction of the first input queue and the second input queue based on the network traffic.

10. The non-transitory, computer-readable storage medium of claim 6, wherein the computer executable instructions are further configured for:

utilizing the first input queue for direct memory access (DMA) for a first memory type and the second input queue for direct memory access (DMA) for a second memory type.

11. The non-transitory, computer-readable storage medium of claim 6, wherein the computer executable instructions are deployable to a client system from a server system at a remote location.

12. The non-transitory, computer-readable storage medium of claim 6, wherein the computer executable instructions are provided by a service provider to a user on an on-demand basis.

* * * * *